UNITED STATES PATENT OFFICE.

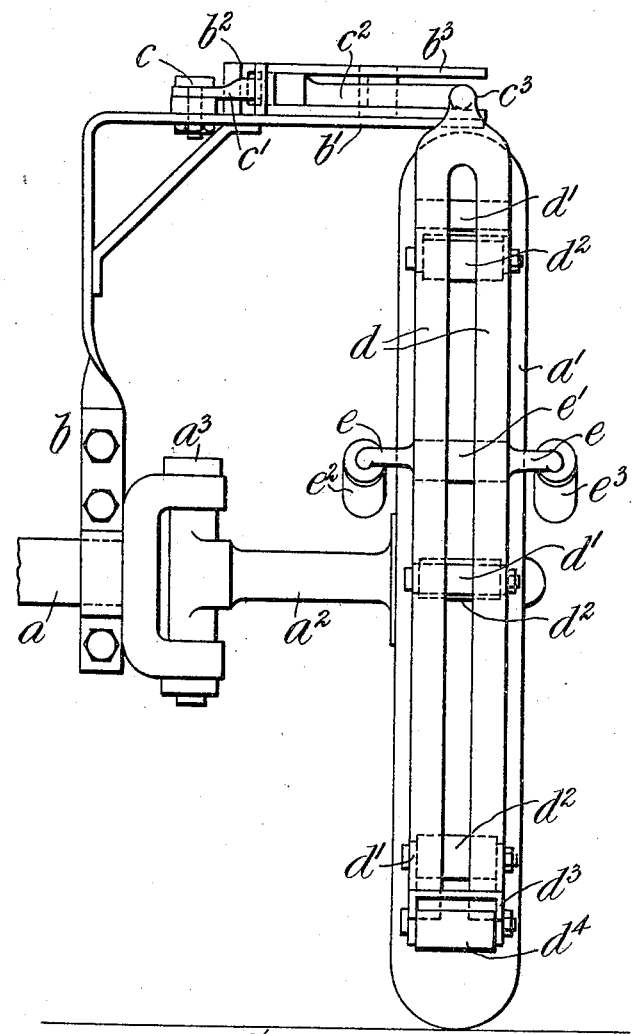

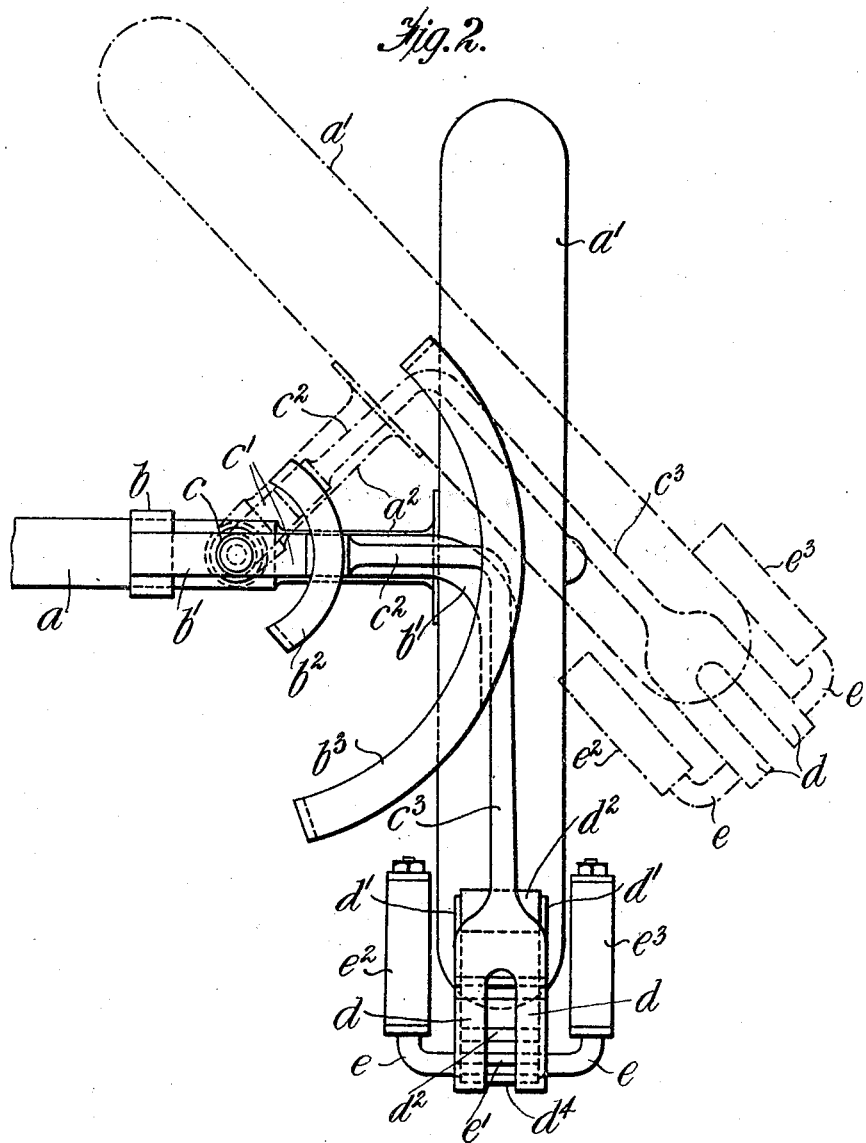

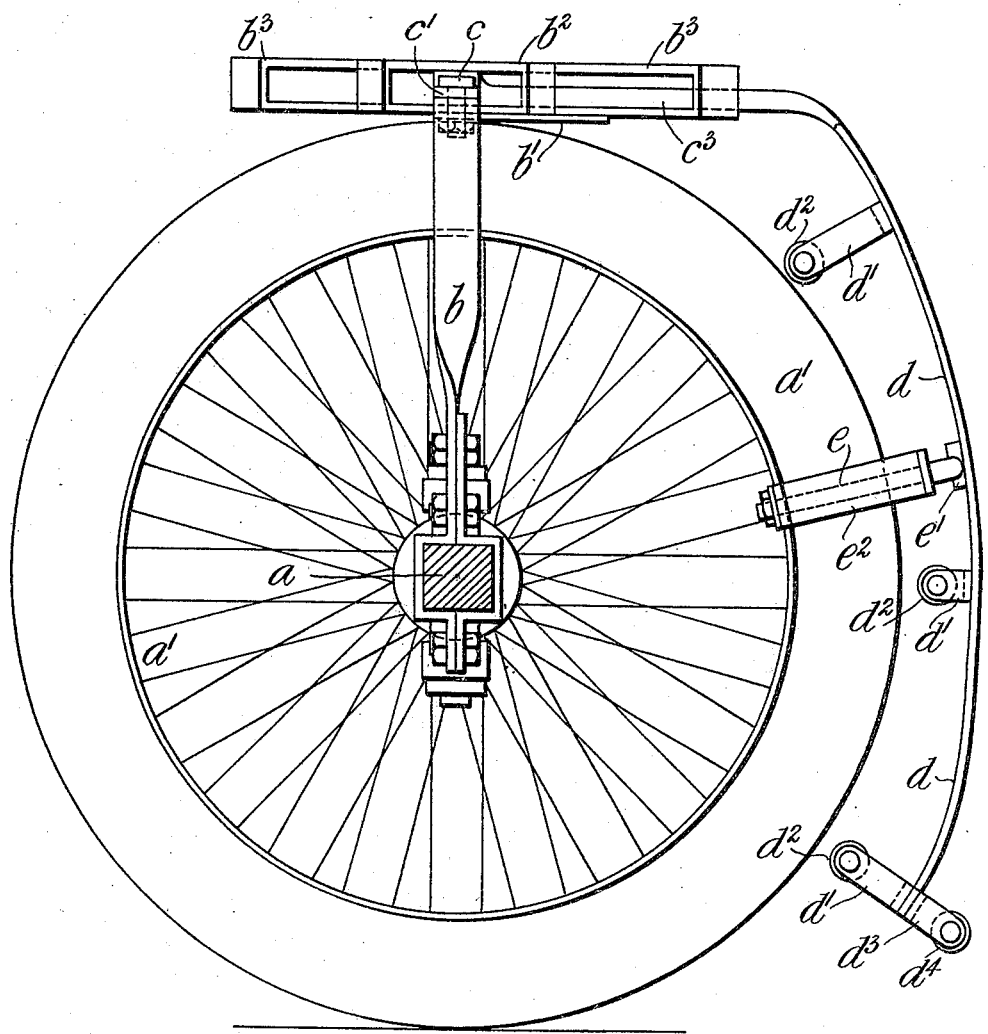

WILLIAM HENRY PUTTERGILL, OF HERNE HILL, LONDON, ENGLAND.

BRAKE AND WHEEL-GUARD FOR VEHICLES.

1,326,093.   Specification of Letters Patent.   Patented Dec. 23, 1919.

Application filed March 8, 1918. Serial No. 221,334.

*To all whom it may concern:*

Be it known that I, WILLIAM HENRY PUTTERGILL, a subject of the King of Great Britain and Ireland, and a resident of Herne Hill, county of London, England, have invented a certain new and useful Improvement in Brake and Wheel-Guards for Vehicles, of which the following is a specification.

My invention has for its object the provision of a combined safety guard and brake for the front wheels of motor road vehicles, said guard, which is of the type in which the guard moves with the wheel when steering, being characterized by the method and means by which the same is moved, and being of flexible nature, so that on encountering an object or obstruction it is immediately forced backward on to the tire of the wheel upon which resistance or a braking action is obtained by means of rollers carried by the rear face of the guard, thus assisting the driver to pull up directly said obstruction is encountered.

For a clear understanding of the invention, reference is to be had to the following description and accompanying sheets of drawings in which the guard is shown supported from the dead axle. In the drawings:—

Figure 1 is a front view of a wheel and axle to which my invention is applied.

Fig. 2 is a plan view thereof.

Fig. 3 is a side elevation of a wheel having the invention applied thereto.

Like letters of reference indicate corresponding parts in the several figures.

In carrying out the invention, there is affixed to the dead axle $a$, or it may be the chassis, a right-angled bracket $b$, and on the upper surface of the arm $b'$ thereof two slotted quadrants $b^2$, $b^3$ respectively—Figs. 1, 2 and 3—are affixed, said quadrants $b^2$, $b^3$ being located at a height slightly above the top of the wheel $a'$ which is carried by stub axle $a^2$, pivoted at $a^3$ to the dead axle, and of these quadrants $b^2$, $b^3$, the quadrant $b^3$ extends over the top of the wheel.

To the arm $b'$ of the bracket $b$ there is pivoted at $c$ the inner end $c'$ of a rod or the like $c^2$ whose outer part $c^3$ is bent at right angles thereto so as to be in vertical, central, longitudinal alinement with the wheel $a'$, said rod $c^2$, which passes through the slotted quadrants $b^2$, $b^3$, being of a size such as to fit the slot of the quadrant $b^2$ but not the slot of the quadrant $b^3$, and to this outer part $c^3$ is affixed, in any suitable manner, or formed integral therewith, the guard $d$ which may—as shown in Figs. 1 and 3—be constituted by two thin flat strips of metal which extend down in front of the wheel and to within a short distance from the ground, said guard $d$, if desired, being padded or provided with air cushions, rubber or other suitable devices or means.

On the rear face of the guard $d$ and carried in brackets $d'$ thereon are the rollers $d^2$, the same being arranged transversely of the tire, so that if said guard is forced backward, said rollers $d^2$ contact with the tire of the wheel with a braking action, and on the front face of said guard $d$ and at its lower end there is also provided a transversely disposed roller $d^4$ carried in brackets $d^3$ so that if the wheel drops into a depression and the roller contacts with the ground, said guard is forced upward, springing in the slot of the quadrant $b^3$.

Rotatably mounted on U-shaped bracket $e$ on the guard $d$ and projecting backward on each side of the wheel $a'$ parallel thereto and at a slight distance therefrom, are the rollers $e^2$, $e^3$ respectively, by means of which the guard $d$ is caused to move with the wheel $a'$ in said wheel's lateral movements.

For instance, say the wheel $a'$ is turned by any of the known means, to the position shown in dot-and-dash lines Fig. 2, then said wheel $a'$ moves on its pivot $a^3$ independent of the guard until it contacts against the roller $e^3$ and then moves said roller $e^3$ along with it, and with said roller $e^3$, the guard $d$ and rod $c^2$, said rod $c^2$ swinging on its pivot $c$ and in the quadrants $b^2$, $b^3$, reverse movement of the wheel $a'$ bringing the other side of the wheel into engagement with the roller $e^2$, carrying the guard and rod back to the position shown in full lines in Fig. 2.

Having now described my invention, what I claim as new and desire to secure by Letters Patent of the United States is:—

1. A combined wheel guard and brake device for road vehicles including in combination with a fixed axle and the stub axle pivoted thereto and carrying the wheel, a stationary bracket secured to the fixed axle, a wheel guard member having means adapted to engage both the tread and sides of the wheel, and a supporting member rigid with the wheel guard and pivoted to the bracket in vertical alinement with the pivot between the stub and fixed axles.

2. A combined wheel guard and brake device for road vehicles including in combination with a fixed axle and a stub axle pivoted thereto and carrying the wheel, a stationary bracket secured to said fixed axle, a wheel guard member having means adapted to engage both the tread and sides of the wheel, an arm rigid with the wheel guard for supporting the same in position, and means for pivotally connecting the end of said arm with the bracket at a point in vertical alinement with the pivot which connects the stub and fixed axles.

3. A combined wheel guard and brake device for road vehicles including in combination with a fixed axle and the stub axle pivoted thereto and carrying the wheel, a stationary bracket secured to said fixed axle, a wheel guard member having a plurality of transverse rollers carried upon the inner face thereof and opposite rearwardly disposed rollers carried by the sides of said guard member for engaging the sides of the wheel, an arm for suspending the guard member in position, means carried by the bracket for shiftably supporting said arm and limiting its arcuate movement, and a pivot pin connecting said arm to the bracket, said pin being in alinement with the pivot which connects the fixed and stub axles.

4. In motor road vehicles, a combined wheel guard and brake including a bracket carried by the vehicle, a guard comprising a cranked rod pivoted at one end to said bracket and at its other end terminating in a thin curved and flat plate located in the plane of the wheel at the front thereof, inner and outer quadrants carried by the bracket and in which quadrants said cranked rod takes, the outer quadrant supporting the weight of the guard and the inner quadrant guiding and limiting the movement of the cranked rod, longitudinally rearwardly disposed side rollers carried by said guard plate to engage with the sides of the tire, transversely disposed rollers on the inner side of the guard, and a transversely disposed roller on the outer end of said guard, said inner rollers contacting with the tire on the give of the guard on meeting an obstruction or on the outer roller contacting with the road surface.

In testimony whereof I have affixed my signature hereto this 4th day of February, 1918.

WILLIAM HENRY PUTTERGILL.